May 5, 1936. H. KREIDEL 2,040,007
CENTRAL LUBRICATING DEVICE
Filed Nov. 25, 1930
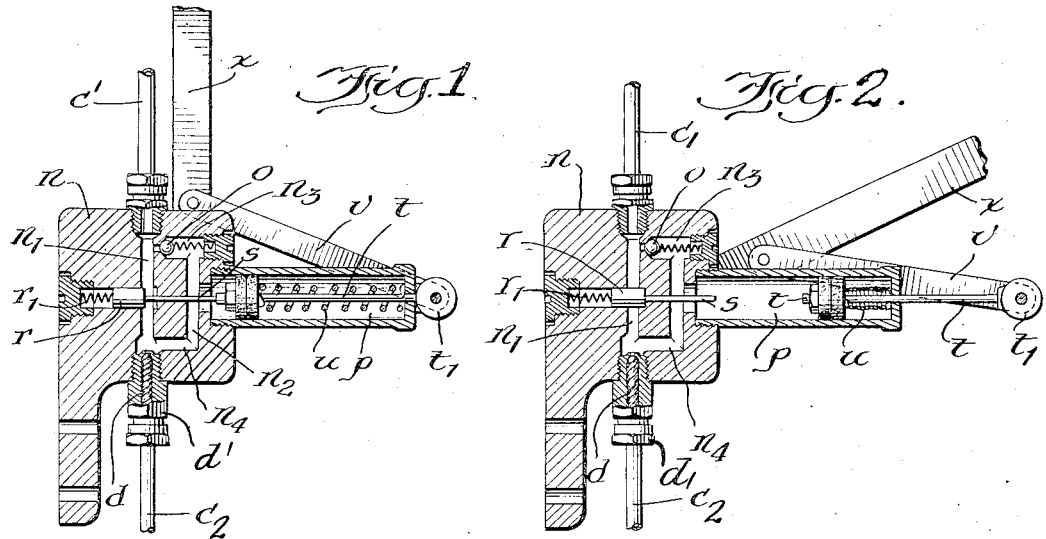
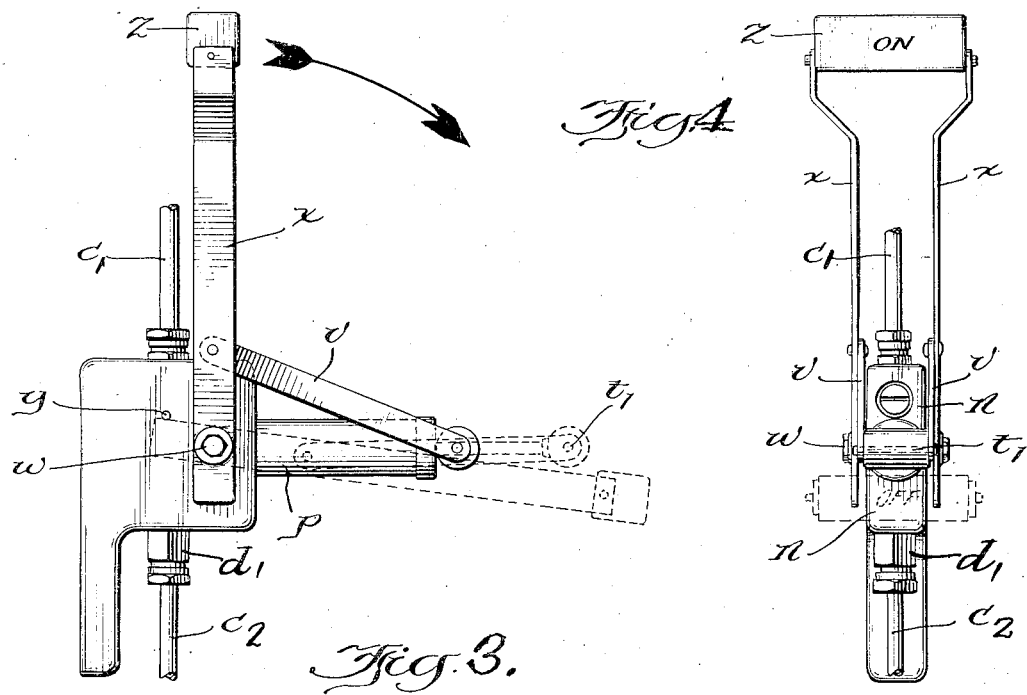
Inventor:
Hans Kreidel
By Williams, Bradbury,
McCalib & Hinkle
Attys.

Patented May 5, 1936

2,040,007

UNITED STATES PATENT OFFICE 2,040,007

CENTRAL LUBRICATING DEVICE

Hans Kreidel, Wiesbaden, Germany

Application November 25, 1930, Serial No. 497,991
In Germany June 13, 1930

5 Claims. (Cl. 184—28)

The invention relates to a central lubricating device equipped with a lubricant container located at the highest point of the lubricant distributing pipes and wherein the lubricant flows to the points to be lubricated under the action of gravity.

It is an object of the invention to provide a device of this character, in which the lubricant in the distributing pipes is normally only under the head of the lubricant in the container, with means adapted to place the distributing pipes temporarily under increased pressure. This means consists of an auxiliary pump which is designed to supply, when necessary, a larger quantity of lubricant to the points to be lubricated. The auxiliary pump is connected with a separate passage which is provided in the form of a by-pass and is connected above and below the auxiliary pump connection with a conduit leading from the lubricant container directly to a system of distributing pipes. In the upper connecting passage of said by-pass is arranged a spring actuated non-return valve which is opened by the suction stroke of the auxiliary pump and is closed automatically when the pump executes its return or pressure stroke. The conduit connecting the lubricant container directly with the distributing pipe is provided with a spring actuated valve member, which is controlled by the piston of the auxiliary pump or an extension thereof, so that during the suction stroke of the auxiliary pump this conduit is closed, while this conduit is opened shortly before the end of the pressure stroke of the auxiliary pump.

In the drawing:

Figure 1 is a sectional view of the device in which the lubricant passage of a fitting is provided with a by-pass to which is connected an auxiliary pump and wherein a spring actuated valve member for controlling the lubricant passage is located along an extension of the piston rod of the pump and is adapted to be actuated thereby, while a non-return valve is provided in the upper portion of the by-pass.

Figure 2 shows a similar sectional view of the device with the valve member in closed position, Figure 3 is an elevation view of the device, and Figure 4 shows a front view of the device.

In the figures $n$ indicates a fitting provided with a vertical passage $n_1$ to the top of which is connected a pipe $c_1$ leading from a lubricant container (not shown) positioned at a level higher than any of the distributing pipes. The lower end of the passage $n_1$ is connected by a nipple $d_1$ with a discharge pipe $c_2$ leading to the lubricant distributing pipes (not shown). The bore of the nipple $d_1$ is provided with a wick $d$ forming a flow resistance. Parallel to the passage $n_1$ the fitting $n$ is provided with a by-pass passage $n_2$ which is connected to the passage $n_1$ by means of two transverse passages $n_3$ and $n_4$. In the upper transverse passage $n_3$ there is provided a non-return valve $o$ which opens towards the by-pass passage $n_2$. The lower transverse passage $n_4$ terminates above the wick $d$ in the passage $n_1$. Between the two transverse passages $n_3$ and $n_4$ a pump $p$ is connected to the by-pass passage $n_2$ and along an extension of the axis of the pump there is provided a spring actuated valve member $r$ in the form of a piston for traversing the passage $n_1$. A guide rod $s$ of the valve member $r$ extends across the passage $n_1$ and the by-pass passage $n_2$. A spring $r_1$ urges the valve member $r$ toward the right so that the free end of the rod $s$ engages the left hand end of the piston rod $t$ of the pump. Around that portion of the piston rod $t$ which is positioned on the right side of the pump piston is coiled inside the pump cylinder a spring $u$. The extreme right hand end of the piston rod $t_1$ extending from the pump cylinder is connected by links $v$ to suitable operating levers $x$ rotatably mounted on the casing $n$ at $w$.

When the operating levers $x$ are moved in the direction of the arrow in Figure 3 the piston rod $t$ with the piston is drawn outwardly, thereby compressing the spring $u$. The valve member $r$ under the action of the spring $r_1$ is caused to follow this movement and closes the passage $n_1$ (Figure 2), while the non-return valve $o$ is opened under the suction action of the pump $p$ so that lubricant is withdrawn from the lubricant container. The discharge of the lubricant into the system of distributing pipes is effected through the lower transverse passage $n_4$ either by the piston of the auxiliary pump, which piston is urged to the left by pressure of the expanding spring $u$ or by manual actuation of the levers $x$ by returning the same in a direction opposite to the arrow in Figure 3. The automatically operating non-return valve $o$ remains closed, while the valve member $r$ is moved, against the action of its spring $r_1$, positively by the inner end of the piston rod $t$ of the auxiliary pump and thus again opens the direct passage for the lubricant through the passage $n_1$ (Figure 1). This opening of the direct passage $n_1$ takes place shortly before the end of the pressure stroke of the pump. A small neglectable portion of the lubricant, which is discharged by the auxiliary pump, may return upwardly into the pipe $c_1$ because the passage $n_1$ by reason of the opened valve member $r$ is also opened at its upper end shortly before the piston of the auxiliary pump reaches the end of its pressure stroke. This quantity of lubricant which may be forced upwardly back into the pipe $c_1$ by the auxiliary pump, however, is so small that it does not materially affect the operation of the device. On the fitting $n$ are provided pins $y$ (Fig. 3) which form stops for the free rear ends of the operating levers $x$ when the same have been moved into the position indicated in broken lines in Fig. 3. In this position the valve member $r$ closes the passage $n_1$.

When the operating levers $x$ are in the lowered position as shown in Figure 3 the piston of the auxiliary pump $p$ is held in its withdrawn position by reason of the fact that the pivotal points of the links $v$ connected to the operating levers $x$ have been moved downwardly beyond the axial mid-position and thus beyond the dead-center position. The handle $z$ of the operating levers $x$ is of rectangular cross section and is provided with markings which in any position of the operating levers enable the operator to see whether the passage $n_1$ between the supply pipe $c_1$ and the discharge pipe $c_2$ is open or closed.

I claim as my invention:

1. A lubricating device for a centralized lubricating system comprising a container positioned at the highest point of the system for gravitationally feeding lubricant thereto, a pump associated with said container, and means controlled by said pump for rendering the gravitational feed ineffective shortly after the beginning of the suction stroke of said pump until shortly before the end of the pressure stroke of the same.

2. A lubricating device for a centralized lubricating system comprising a lubricant container located at the highest point of the system for gravitationally supplying lubricant thereto, a conduit connecting said container with said system, a valve in said conduit, a by-pass around said valve, a pump connected to said by-pass, and a valve in said by-pass between said pump and said container for preventing the return of lubricant from said pump to said container.

3. In a centralized lubricating system a container for gravitationally feeding lubricant thereto, a conduit connecting said container with said system, a closure member in said conduit, a by-pass around said closure, a cylinder connected to said by-pass, a check valve in said by-pass between said cylinder and said container, and a piston reciprocable in said cylinder adapted to operate said closure member.

4. A lubricating device for a centralized lubricating system comprising a container located at the highest point of the system for gravitationally supplying lubricant thereto, an auxiliary pump associated with said container, a manually operable lever for operating said pump, and mechanical means automatically operable upon the intake stroke of said pump for preventing the gravitational flow of lubricant to the system.

5. In a lubricator for a centralized lubricating system, a container for gravitationally supplying lubricant to the system, a pump for supplying lubricant to the system under pressure, and a device for rendering said gravitational supplying means ineffective, comprising a casing having a conduit connecting said container with said system, a valve in said conduit, a by-pass around said valve, said pump connected to said by-pass, a stem carried by said valve projecting into said by-pass, and a member on said pump cooperable with said stem to actuate said valve.

HANS KREIDEL.